Feb. 14, 1933.  N. W. CUMMINGS  1,897,419
GASOLINE GAUGE
Filed March 22, 1922  3 Sheets-Sheet 1
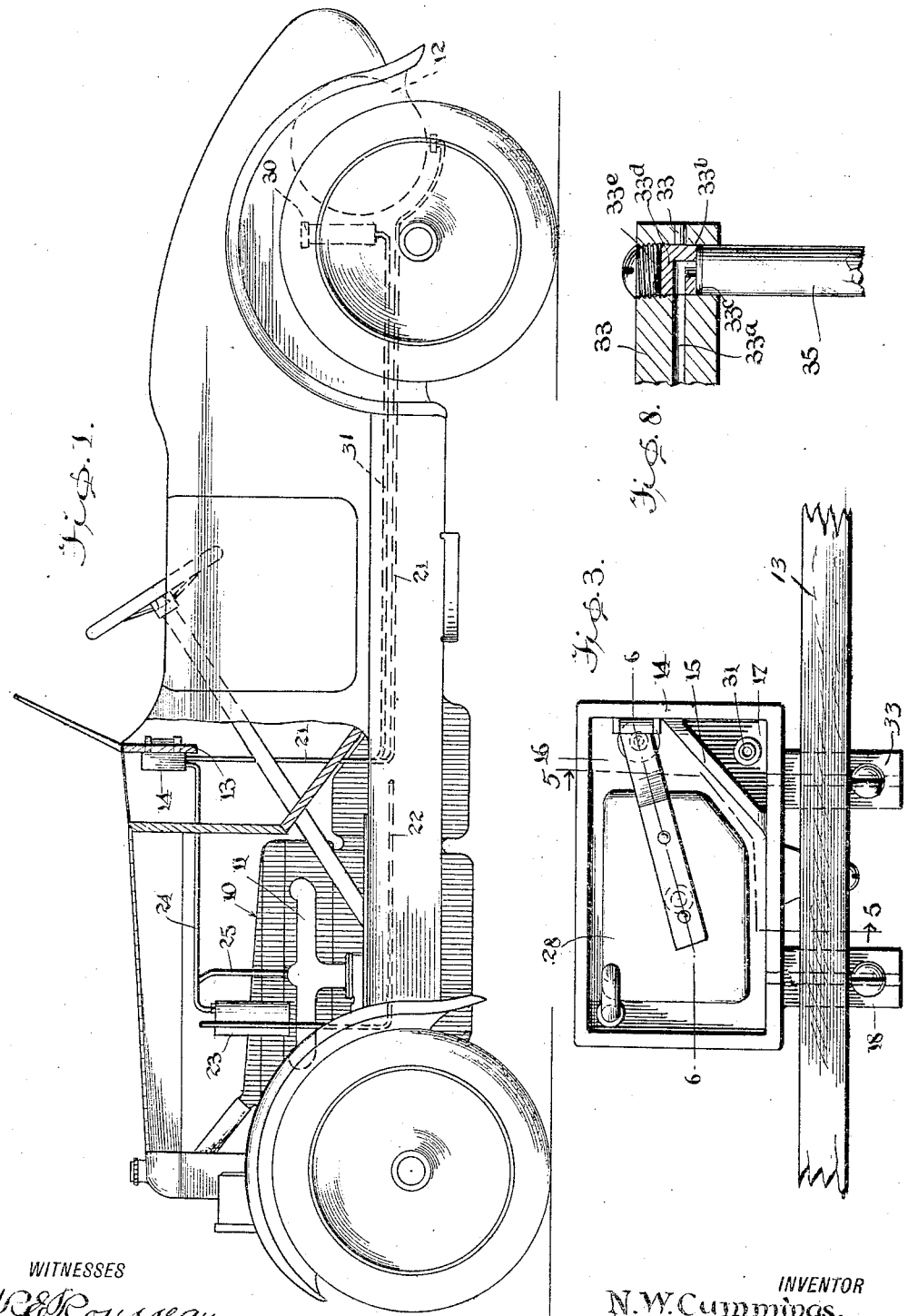
WITNESSES
H. E. Rousseau
W. F. Buckley
INVENTOR
N. W. Cummings,
BY Munn & Co.
ATTORNEYS

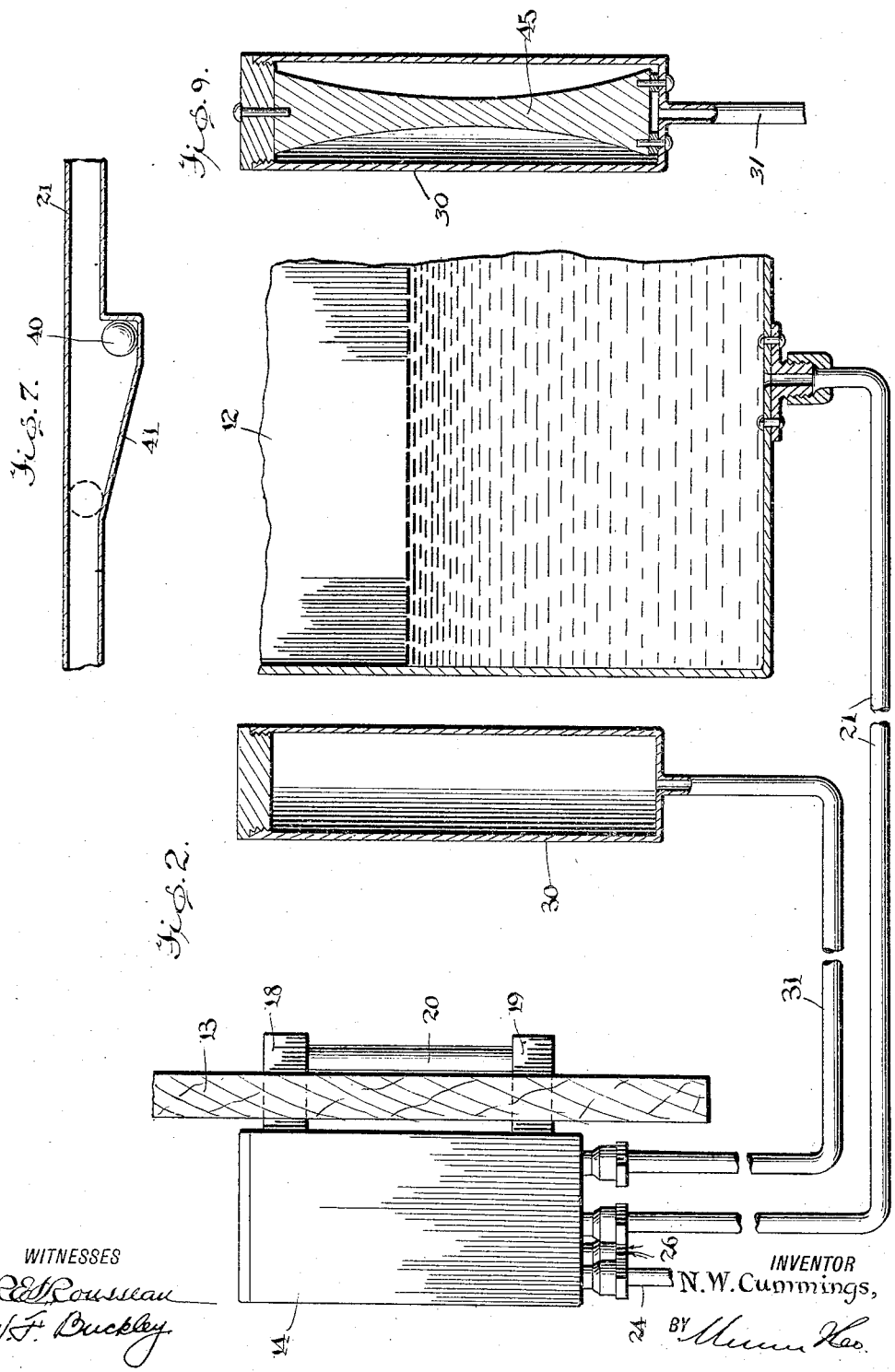

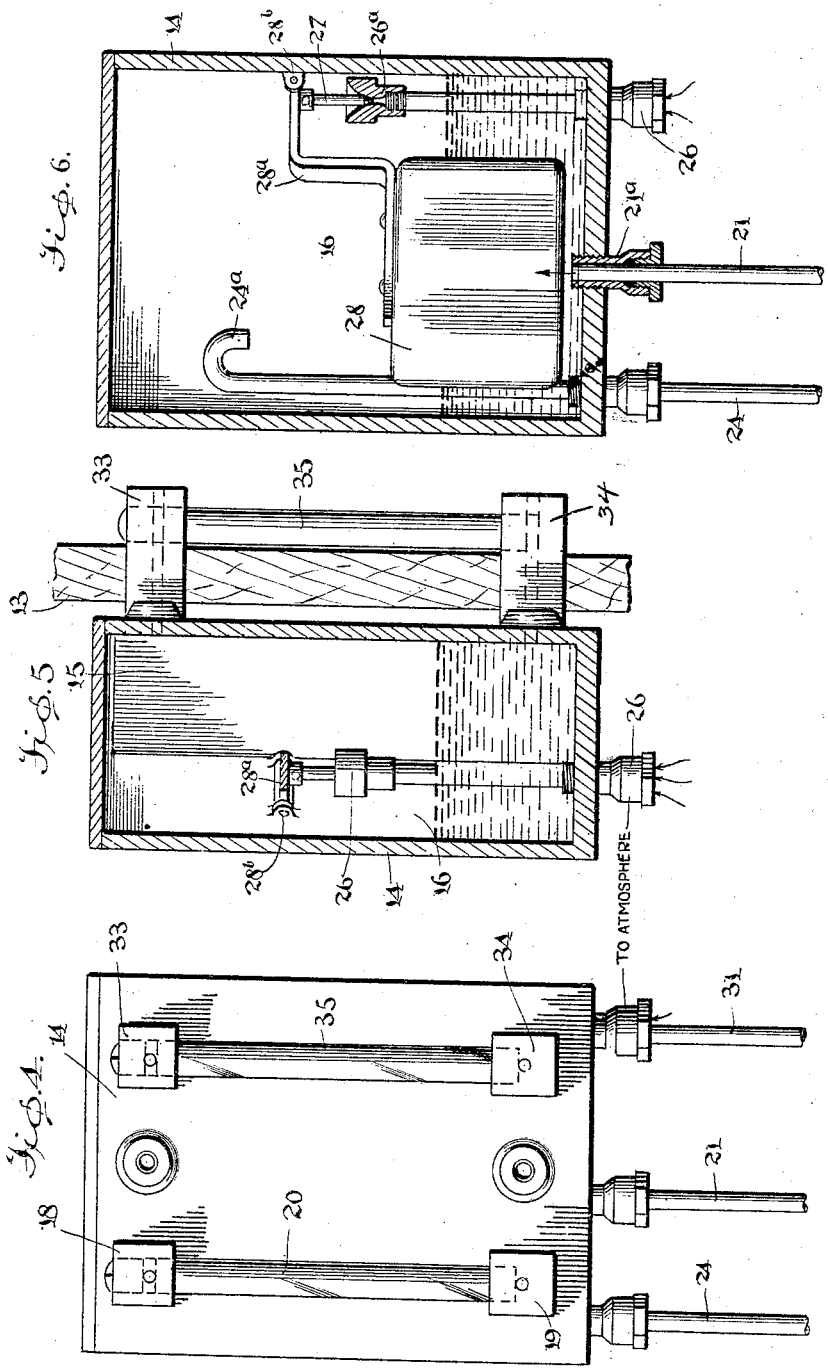

Patented Feb. 14, 1933

1,897,419

UNITED STATES PATENT OFFICE

NEPHI W. CUMMINGS, OF LA JOLLA, CALIFORNIA

GASOLINE GAUGE

Application filed March 22, 1922. Serial No. 545,722.

My present invention relates generally to gasoline or other similar gauges and more particularly to devices for indicating the volume of the gasoline in the fuel tank of an automobile. The operation of my improved gauge depends upon the change of pressure at the bottom of the tank, which always results when gasoline is added to, or taken from the tank. My primary object is the provision of an accurate efficient gauge, the reading indicator of which may be located on the dash or instrument board of motor vehicles, and may be calibrated so as to indicate directly the number of gallons of gasoline in the gasoline supply tank.

A further object of the invention is the provision of a simple, inexpensive device of this nature which will read accurately at all times, irrespective of the longitudinal elevation or inclination of the vehicle, so that the gasoline supply will be under the notice of the operator at all times, like the other controls of the car.

A still further object is the provision of a suction arrangement for maintaining a predetermined gasoline level in a vessel, in turn controlled by the gasoline level in the said vessel, together with novel means for measuring the suction required for this purpose, and thus determining the level in the tank to be measured.

Other objects, and the resulting advantages, of my present improvement, will be apparent from the following description, referring to the accompanying drawings, forming a part of this application, and wherein:

Figure 1 is a side elevation illustrating the practical application of my improvement;

Figure 2 is an enlarged longitudinal section through the apparatus proposed by my improvement;

Figure 3 is a plan view of the gasoline receiver, the cover thereof being removed;

Figure 4 is a view in front elevation, showing the gauge glasses and their connections;

Figure 5 is a view in section on line 5—5 of Figure 3;

Figure 6 is a view in section on line 6—6 of Figure 3, the float and its lever being shown in elevation for the sake of illustration;

Figure 7 is a longitudinal section through a portion of the gasoline pipe showing an automatic valve for use therein;

Figure 8 is a detail view in section illustrating the construction of a connection and gauge glass; and Figure 9 is a detail sectional view illustrating a modified form of manometer arm.

Referring now to these figures, and particularly to Figure 1, I have shown portions of an automobile or motor car, wherein the engine appears at 10, with its intake manifold at 11, and a rear tank is indicated at 12. In this figure, the dash or instrument board is indicated at 13, in its usual relation to the various controls of the car, not shown, and the operator seat in the front of the car, and it is upon this dash or instrument board that my invention proposes the location of at least the reading portion of my improved gauge so that the gasoline level in the tank 12 will be under the constant attention of the operator of the vehicle, and at all times within his view when seated in the car.

For this purpose my invention proposes a gasoline receiver or container 14 which is securely mounted upon the front face of the dash or instrument board 13 and thus concealed from view. The gasoline receiver is provided interiorly thereof with a partition 15 which divides the interior of the receiver into a gasoline chamber 16 and a chamber 17 which constitutes an element of the manometer to be hereinafter more fully described. The partition 15 completely isolates the chambers from each other except at the top where this partition terminates below the cover or top plate of the receiver so as to permit communication between the two chambers at the top of the receiver. The lower and upper portions of the gasoline chamber, are in communication with upper and lower connections 18 and 19 of a gauge glass 20 which is disposed between the connections upon the rear or exposed face of the instrument board and thus in full view of the operator of the vehicle.

A pipe 21 leads from the gasoline tank 12 and is connected as at 21ᵃ to the bottom of the receiver 14 so as to supply the gasoline chamber 16 thereof. A feed pipe 22 leads as usual from the tank 12 to the vacuum tank 23 of the vacuum feed for supplying the carbureter, and the lifting of liquid gasoline through pipe 21 into the receiver 14 which is located at a higher level than the gasoline tank 12, as clearly seen in Figure 1, is controlled or brought about by the suction within the receiver 14 communicated through a pipe 24 which leads up through the gasoline chamber of the receiver and terminates in a return bend 24ᵃ located well above the normal level of the gasoline in the gasoline chamber, the pipe 24 also connecting with a suction connection 25 leading from the vacuum tank 23 to the inlet manifold 11, as clearly shown in Figure 1. In this manner the pipe 24 communicates to the receiver 14 the vacuum or suction within the motor which ordinarily operates to draw the carbureted gasoline into the motor for combustion.

A stand pipe 26 is also arranged in the gasoline chamber and extends exteriorly thereof and communicates with the atmosphere. The upper end of the stand pipe 26 is located above the highest level of gasoline in the gasoline chamber and has threadedly connected thereto a valve fitting 26ᵃ. A needle valve 27 coacts with the seat of the valve fitting 26ᵃ and has a swivelled or ball and socket connection with a lever 28ᵃ which is secured to a float 28 and is pivotally connected to the receiver, as at 28ᵇ. The opening of the valve fitting 26ᵃ converges, as shown in Figure 6 and cams the needle valve 27 into engagement with its seat. The needle valve 27 is thus float controlled and it serves to regulate inflow of air through the stand pipe 26 and consequently to control or regulate the level of the gasoline in the chamber 16. In this connection it is obvious that when the valve 27 is closed to prevent flow of air through the stand pipe 26 into the chamber 16, as it normally is, the vacuum or suction communicated to the chamber through the pipe 24 will be effective to draw or lift the gasoline into the chamber from the fuel tank 12. When the level of the gasoline has reached the predetermined or desired height the float 28 will have been raised a sufficient distance to open the needle valve 27 and momentarily permit air to flow in through the pipe 26. The arrangement is such that the air that is thus permitted to flow in through the pipe 26 reduces the suction in the gasoline receiver so that the gasoline level is not further raised but may fall. When the level falls the valve 27 is again closed and the suction is again effective to draw or raise the gasoline into the receiver. The suction in the receiver is never destroyed and is so controlled as to vary but slightly and for all practical purposes may be regarded as constant.

It is obvious from the foregoing that in order to maintain the desired predetermined level of gasoline in the receiver 14, a pressure is required in the upper portion of the receiver which is proportional to the height of the level of the gasoline in the tank 12, to be measured, and a gradually increasing vacuum will be necessary in the receiver as the gasoline is used out of the tank 12 and the level thereof falls, and it is therefore obvious that by measuring the negative pressure or suction within the receiver 14, the level of gasoline in the tank 12 can be accurately determined at all times.

It is equally obvious, however, that in measuring the pressure to accurately determine the level within the tank 12, some means will of necessity be required which will tend to compensate for the constantly varying distances between the levels of the tank 12 and the receiver 14 in the normal operation of the automobile.

In order to measure the pressure within the receiver and avoid the inaccuracies and disadvantages of the application of an ordinary pressure gauge for this purpose, I propose a manometer which includes a pair of fluid holders or chambers, one of which is constituted by the chamber 17 of the receiver 14, and the other of which is designated at 30 and is arranged adjacent to the fuel tank 12, these holders being connected by a pipe 31 entering the lower ends of the holders at its respectively opposite ends.

The upper end of the holder 17 is furthermore in communication with the gasoline chamber 16 of the receiver 14 so that there is thus communicated to the upper portion of the holder 17 a pressure equal to that existing within the upper portion of the receiver 14.

Within the holders 17 and 30 and their connecting pipe 31, a non-evaporating liquid of suitable nature is carried, and is thus acted upon by the same pressure existing within the receiver 14, so as to draw this liquid upwardly from the lower holder 30 to the upper holder 17. In this case, however, the liquid level within the holder 30 obviously varies in accordance with the existing pressure and thus as the necessary vacuum within the receiver 14 increases owing to a lowering of the liquid level within the main tank 12, the gasoline level within the holder 17 of the measuring device proportionately rises, and this movement, as well as the level within the holder 17, is in full view of the operator at all times by virtue of the communication of the upper and lower portions of the holder 17, through upper and lower connections 33 and 34, with a gauge glass 35 mounted upon the rear exposed surface of the dash or instrument board 13, alongside the gauge glass 20 before described. The upper and lower connections 33 and 34 as well as the connections 18 and 19 are of identical construction and a detail description of one will serve for all. For the purpose of illustration the connection 33 is shown (see Figure 8). This connection 33 comprises a block of metal bored longitudinally, as at 33ª and having an opening 33ᵇ intersecting the longitudinal bore. The opening 33ᵇ receives the upper end of the gauge glass 35 and around the upper end of the gauge glass an annular gasket 33ᶜ or other packing is provided. A short plug or screw 33ᵈ has threaded engagement with the wall of the opening 33ᵇ and bears against the gasket 33ᶜ to force it into packing engagement and the plug or screw is provided with an axial and a radial bore affording communication between the bore 33ª and the gauge glass 35 (see Fig. 8). A short screw plug 33ᵉ maintains the plug 33ᵈ in position.

By thus providing a pressure measuring arrangement including a holder 30 located adjacent to the main tank 12, it is obvious that when the forward part of the motor car is elevated above the normal, the extra vacuum that then exists within the receiver 14 in order to maintain the predetermined liquid level, will be compensated for by the fact that this extra vacuum is similarly needed to maintain the proper level in the holder 17, the increased weight of the liquid in the pipe 31 and holder 30 thus compensating for the extra vacuum. The same is true when the machine is inclined in the opposite direction, although to obviate danger of flooding the receiver 14 in extreme inclination, I may utilize an automatic cut-off in the pipe 21, as seen in Figure 7, consisting of a ball 40 freely disposed upon the inclined face 41 of a valve chamber located within the pipe so that excessive inclination will cause the ball 40 to roll into the dotted line position, closing the pipe 21 against the flow of further gasoline to the receiver 14. This automatic valve last mentioned may or may not be needed in practical use and its presence will depend to a considerable extent upon the position of the fuel tank 12 upon the automobile.

It is evident that as the liquid level in the holder 17 rises, that in the holder 30 must fall, and the magnitude of the rise in the one and fall in the other can bear any desired relation to each other, but the total change will always be determined by the change of level of gasoline in the supply tank. If the cross sectional area of holder 17 is large, while that of holder 30 is small, then most of the change of level will take place in holder 30 and the level in holder 17 will change but little. If the two holders are about equal in cross section, then the two levels will change about equally. Moreover, if the cross sectional area of either holder, 30 for example, is not the same at all depths, being for example greater at the middle than at the ends, then when the gasoline tank is about half full, and the adjustments are such as to cause the liquid level in holder 30 to be about midway between top and bottom, then a small change of depth of gasoline will produce a relatively large change in the position of the liquid in holder 17, but if the liquid level in holder 30 is near the top or bottom of the holder, then a change of level in the gasoline tank of similar magnitude to that of the previous case will produce a small change of level of the liquid in holder 17. It is proposed to utilize this principle in connection with cylindrical tanks in which the volume is not proportional to the depth. The principle will be applied by making the net cross section of holder 30 larger in its middle portion than at the ends, the result to be accomplished by means of a core 45, Figure 9, moulded with the proper variation of cross section and placed axially in the holder. Thus the gauge glass 35 can be made to read, not inches of gasoline, but gallons instead, even in a cylindrical tank. It is to be understood that the holder shown in Figure 9 is placed in operative position alongside of the tank 12 and is connected with the pipe 31 as in the other form.

I claim:

1. The combination with the gasoline supply tank of a combustion engine, of a gauge which comprises a gasoline receiver disposed above the supply tank, a pipe communicating with the tank at the maximum depth to be indicated and connecting said tank with the lower portion of the receiver below the liquid level therein, engine controlled suction means connected to said receiver above the liquid level therein, liquid level controlled means in said receiver, suction measuring means for the receiver and including a pair of closed liquid holders connected to one another, one of which holders being positioned adjacent to the receiver and exposed in its upper portion above the liquid level to the suction existing therein and the other of which is mounted adjacent to the supply tank, and means connecting and communicating the lower portion of said holders.

2. The combination with the gasoline supply tank of a combustion engine, of a gauge which comprises a gasoline receiver disposed above the supply tank, a pipe communicating with the tank at the maximum depth to be indicated and connecting the tank with the lower portion of the receiver below the liquid level therein, the gasoline receiver having an atmospheric connection, a suction connection leading to said receiver above the liquid level therein, liquid level actuated means in said receiver for controlling communication with said atmospheric connection to maintain a constant level in said receiver, and means for measuring pressure within said receiver to thereby indicate the level of the liquid in the gasoline supply tank.

3. The combination with the gasoline supply tank of a combustion engine, of a gauge comprising suction control means including a chamber for elevating a portion of the liquid above the supply tank, liquid level actuated means associated with the suction control means for controlling said suction means to hold the elevated liquid at a definite level in said chamber, and means for measuring the pressure required to hold the liquid at said level in said confined space, said last-mentioned means including connected liquid holders, one of which is disposed at the level of the supply tank and the other of which is disposed at the elevated liquid level and subjected to the pressure required to maintain said level, said other holders being in communication with the said chamber.

4. The combination with the gasoline supply tank of a combustion engine, of a gauge comprising suction control means including a chamber for elevating a portion of the liquid above the supply tank, liquid level actuating means operatively connected with the suction control means for controlling said suction means to hold the elevated liquid at a definite level in said chamber, means for measuring the pressure required to hold the liquid at the said level, said last-mentioned means including connected liquid holders, one of which is disposed at the level of the supply tank and the other of which is disposed at the elevated liquid level and subjected to the pressure required to maintain said level whereby to indicate the level of the liquid in the supply tank, one of said holders having a varying cross sectional area to vary the ratio between the change of liquid level in the supply tank and the change of liquid level in the holder at the elevated liquid level as liquid is withdrawn from the tank.

5. In apparatus of the class described, a liquid holding tank, means forming an inclosed chamber, a connection for creating a partial vacuum in said chamber, means affording communication between said chamber and the liquid in said tank at the minimum level to be gauged whereby the liquid may be drawn into said chamber by the vacuum existing therein, said chamber having a valve controlled passage opening to the atmosphere for regulating the degree of vacuum in said chamber, and means responsive to the rise of liquid in said chamber for controlling the opening of said valve.

6. An apparatus for indicating the height of liquid in a tank, comprising the combination with a tank adapted to contain liquid, of a chamber smaller in horizontal area than the tank and extending upwardly and downwardly throughout the range of levels to be indicated, said chamber having a liquid connection with said tank at a low level relatively to said range of levels, a vacuum connection whereby air may be withdrawn from the chamber throughout the normal operation of the apparatus, means controlled by the rise of liquid in said chamber for admitting atmospheric air to said chamber for restricting the degree of vacuum possible to be obtained therein, an indicator adapted to be operated by fluid pressures external and internal of said chamber, and means whereby said indicator is coupled with that part of said chamber in which a vacuum is thus produced.

7. An apparatus for indicating the height of liquid in a tank, comprising the combination with a tank adapted to contain liquid, of a chamber smaller in horizontal area than the tank and extending upwardly and downwardly throughout the range of levels to be indicated, said chamber having a liquid connection with said tank at a low level relatively to said range of levels, a tube leading from said chamber to a region of relatively low pressure, said tube having an unobstructed communication with the chamber, means for automatically admitting air to said chamber in accordance with the level of the liquid in said chamber, an indicator operable by differences between fluid pressures external and internal of said chamber, and means whereby said indicator is coupled with the chamber.

NEPHI W. CUMMINGS.